US012379987B1

(12) United States Patent
Gupta et al.

(10) Patent No.: US 12,379,987 B1
(45) Date of Patent: Aug. 5, 2025

(54) DIGITIZER ERROR DETECTION AND RECOVERY

(71) Applicant: Keysight Technologies, Inc., Santa Rosa, CA (US)

(72) Inventors: Rupali Gupta, Haryana (IN); Atul Gupta, Haryana (IN); Sanjay Verma, Haryana (IN); Mohit Arora, Haryana (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 20 days.

(21) Appl. No.: 18/384,516

(22) Filed: Oct. 27, 2023

(51) Int. Cl.
 *G06F 11/00* (2006.01)
 *G06F 11/07* (2006.01)

(52) U.S. Cl.
 CPC ...... *G06F 11/0793* (2013.01); *G06F 11/0769* (2013.01)

(58) Field of Classification Search
 CPC . G06F 11/0769; G06F 11/0793; G06F 11/079
 See application file for complete search history.

(56) References Cited

U.S. PATENT DOCUMENTS

| 11,281,516 | B2 | 3/2022 | Hsiao et al. | |
|---|---|---|---|---|
| 2007/0057835 | A1* | 3/2007 | Jarman | H04L 49/90 341/155 |
| 2010/0109675 | A1* | 5/2010 | Wong | G01R 31/3167 324/537 |
| 2016/0231357 | A1* | 8/2016 | Taratorin | G01R 13/0254 |
| 2021/0333208 | A1* | 10/2021 | Ragan | G01J 3/2803 |
| 2025/0119150 | A1* | 4/2025 | Joyce | H03M 1/0604 |

OTHER PUBLICATIONS

Jiadong Yuan et al., "Design of JESD204B Multi-channel Data Acquisition and Playback System Based on SoPC," 2018 11th International Congress on Image and Signal Processing, BioMedical Engineering and Informatics (CISP-BMEI 2018), pp. 1-5.
Samrat L. Sabat et al., "Reliable High Speed Data Acquisition System using FPGA," Second International Conference on Emerging Trends in Engineering and Technology, ICETET-09 (IEEE 2009), pp. 392-396.

* cited by examiner

*Primary Examiner* — Jonathan D Gibson

(57) ABSTRACT

A digitizer includes an analog-to-digital converter (ADC), a field programmable gate array (FPGA), a data link of a given interface standard between the ADC and the FPGA, and a display device operatively connected to the FPGA. The FPGA includes an IP controller configured according to the interface standard of the data link. An error detection and recovery method for the digitizer includes applying an analog input source signal to the ADC, acquiring data samples on the data link from the ADC to the FPGA, and the IP controller checking the data samples for errors. When the data samples include errors, the method further includes (a) the IP controller displaying on the display device a waveform of the captured data samples and an error message, (b) a user adjusting a voltage of the input signal source to within a given peak-to-peak voltage range, and (c) the IP controller resetting the data link without power cycling of the digitizer. When the data sample does not include errors, the method includes displaying on the display device a waveform of the captured data samples.

15 Claims, 8 Drawing Sheets

```
SD1_SW : 04.13.00
Setting up HVI...
system is defined
callini added
analog Clock Source of diver ClockSource . INTERNAL
System definition complete...
Compiling HVI...
Loading HVI...
Enter amplitude of input signal (p2p) ___ 1
SD1 Start
Value of amplitude : 1.0
Value of amplitude : 1.0
Value of amplitude : 1.0
Value of amplitude : 1.0
SD1 join function
SD1 configuration done
Running HVI Iteration #1
adc01_rx_lane_invalid_header_err_count = 0x1001
adc01_rx_lane_invalid_header_err_count = 0x0
adc01_rx_lane_crc_mismatch_err_count = 0x101101
adc01_rx_lane_crc_mismatch_err_count = 0x1
adc23_rx_lane_invalid_header_err_count = 0x0
adc23_rx_lane_invalid_header_err_count = 0x400
adc23_rx_lane_crc_mismatch_err_count = 0x100002
adc23_rx_lane_crc_mismatch_err_count = 0x300
adc0_rx_lane_buffer_overflow_out = 0x0
adc1_rx_lane_buffer_overflow_out = 0x0
Errors in decimals
adc01_rx_lane_invalid_header_err_count = 4097
adc01_rx_lane_invalid_header_err_count = 0
adc01_rx_lane_crc_mismatch_err_count = 1052929
adc01_rx_lane_crc_mismatch_err_count = 1
adc23_rx_lane_invalid_header_err_count = 0
adc23_rx_lane_invalid_header_err_count = 1024
adc23_rx_lane_crc_mismatch_err_count = 1048578
adc23_rx_lane_crc_mismatch_err_count = 768
adc0_rx_lane_buffer_overflow_out = 0
adc1_rx_lane_buffer_overflow_out = 0
Indicate Channel 0 seeing errors on interface between ADC and FPGA __ 0x1
Indicate Channel 1 seeing errors on interface between ADC and FPGA __ 0x1
Indicate Channel 2 seeing errors on interface between ADC and FPGA __ 0x1
Indicate Channel 3 seeing errors on interface between ADC and FPGA __ 0x1
Indicate Channel 0 seeing errors on interface between ADC and FPGA __ 0x1
Indicate Channel 1 seeing errors on interface between ADC and FPGA __ 0x1
Indicate Channel 2 seeing errors on interface between ADC and FPGA __ 0x1
Indicate Channel 3 seeing errors on interface between ADC and FPGA __ 0x1
ErrorQuery: -1, ADC CRC ERROR seen on channel 1: This could be due to connectivity issues or channels being driven out of valid input voltage specification.
ErrorQuery: -1, ADC CRC ERROR seen on channel 2: This could be due to connectivity issues or channels being driven out of valid input voltage specification.
ErrorQuery: -1, ADC CRC ERROR seen on channel 3: This could be due to connectivity issues or channels being driven out of valid input voltage specification.
ErrorQuery: -1, ADC CRC ERROR seen on channel 4: This could be due to connectivity issues or channels being driven out of valid input voltage specification.
ErrorQuery: 0, No error.
Done - Press Enter to Exit
```

FIG.3

DIGITIZER ERROR DETECTION AND RECOVERY

BACKGROUND

Storing and retrieving waveforms with correct data samples is the key requirement of a digitizer. One exemplary digitizer module is the M5200A PXIe Digitizer offered by Keysight Technologies. The M5200A is a single-slot PXIe module having four-channels, real-time sequencing technology, and Field Programmable Gate Array (FPGA) with user configurable region. The digitizer module supports four 2 GHz channels with 4.8 GSa/s sampling rate and 12-bits of resolution for high-definition sampling in quantum computing, aerospace and defense applications. Users can create Intellectual Property (IP) and processing algorithms in the user configurable region of the FPGA to custom process the samples of the digitized signal and then transfer processed samples out over a PCIe link to other modules plugged into same PXI chassis or other connected chasses.

SUMMARY

According to an aspect of the inventive concepts, an error detection and recovery method for a digitizer is provided. The digitizer includes an analog-to-digital converter (ADC), a field programmable gate array (FPGA), a data link of a given interface standard between the ADC and the FPGA, and a display device operatively connected to the FPGA. The FPGA includes an IP controller configured according to the interface standard of the data link. The method includes applying an analog input source signal to the ADC, acquiring data samples on the data link from the ADC to the FPGA, and the IP controller checking the data samples for errors. When the data samples include errors, the method further includes (a) the IP controller displaying on the display device a waveform of the captured data samples and an error message, (b) a user adjusting a voltage of the input signal source to within a given peak-to-peak voltage range, and (c) the IP controller resetting the data link without power cycling of the digitizer. When the data sample does not include errors, the method includes displaying on the display device a waveform of the captured data samples.

The data link may be a JESD204 link, and the IP controller is a JESD IP controller.

Resetting of the data link may be transparent to the user.

When the data samples include errors, after the user adjusts the voltage of the input signal source, new data samples may be acquired and a flush operation may be executed to confirm an absence of errors before the IP controller resets the data link.

The data samples may be acquired at a sampling rate of at least 4.8 GSa/sec, and the data samples may be at least 12-bit data samples.

The peak-to-peak voltage range may be about 900 mV.

According to another aspect of the inventive concepts, a digitizer is provided that includes an analog-to-digital converter (ADC) configured to obtain data samples of an input analog source signal, a field programmable gate array (FPGA) including an IP controller and an I/O port for connection to a display device, a data link between the ADC and the FPGA, and a display device operatively connected to the FPGA. The data link operates according to a given interface standard, and the IP controller of the FPGA is configured according to the interface standard of the data link. The FPGA is configured to acquire data samples on the data link from the ADC, and check the data samples for errors. When the data samples include errors, the FPGA is configured to (a) display on the display device a waveform of the captured data samples and an error message, and (b) after a voltage of the input analog source signal is adjusted to within a given peak-to-peak voltage range, restore the data link without power cycling of the digitizer. When the data samples do not include errors, displaying on the display device a waveform of the captured data samples.

The data link may be a JESD204 link, and the IP controller may be a JESD IP controller.

The resetting of the data link may be transparent to the user.

The voltage of the input analog source signal may be adjusted by a user.

When the data samples include errors, after the user adjusts the voltage of the input signal source, the IP controller may be configured to acquire new data samples and execute a flush operation on previously acquired data samples to confirm an absence of errors before the IP controller resets the data link.

The data samples may be acquired at a sampling rate of at least 4.8 GSa/sec, and the data samples may be at least 12-bit data samples.

The peak-to-peak voltage range may be about 900 mV.

BRIEF DESCRIPTION OF THE DRAWINGS

The above and other aspects and features of the inventive concepts will become readily apparent from the detailed description that follows, with reference to the accompanying drawings, in which:

FIG. 3 is a screen shot showing a display example in the case where errors are detected during execution of the method of FIG. 2.

DETAILED DESCRIPTION

Figure 1:
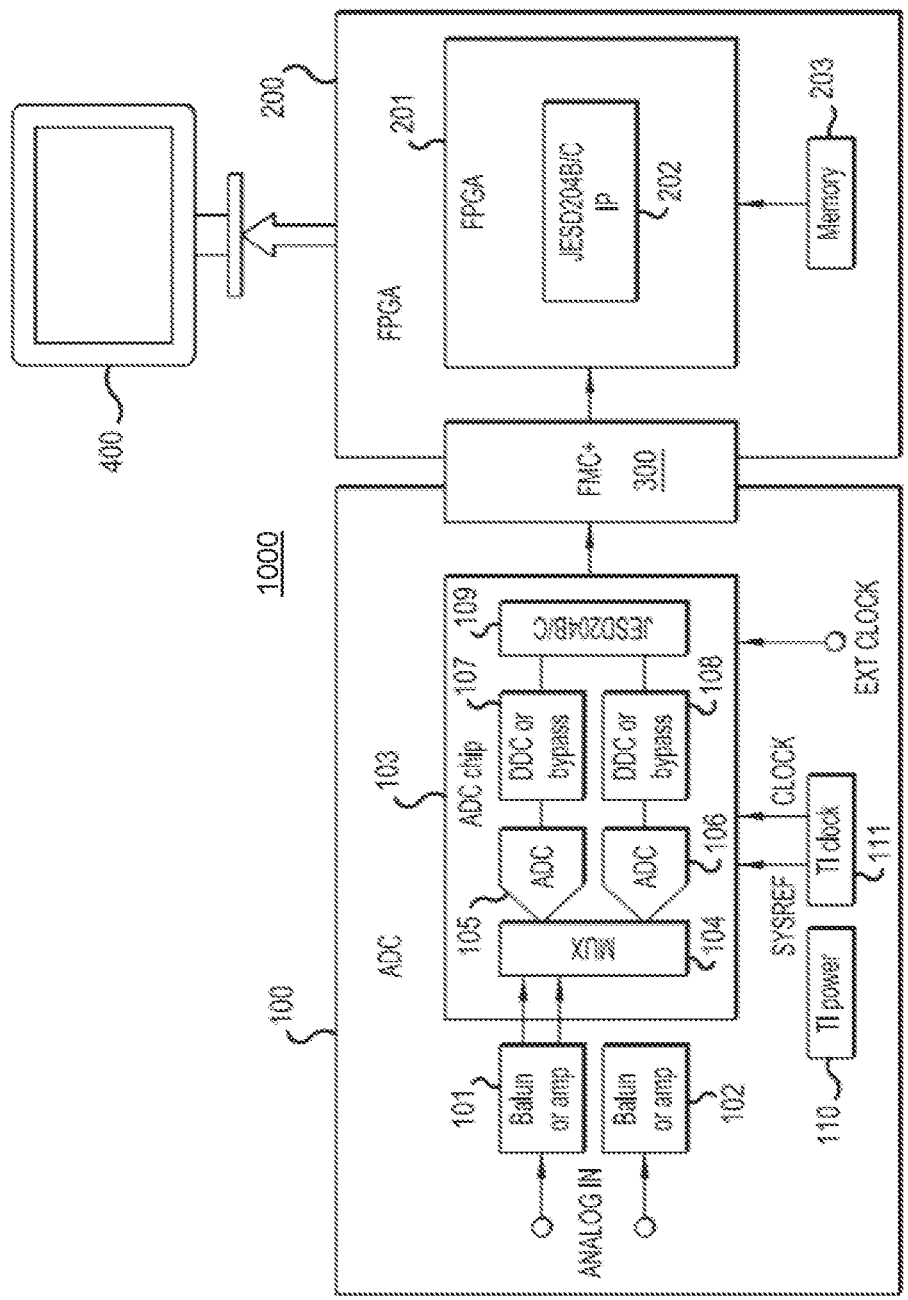
FIG. 1 is a block diagram of a digitizer having a JESD204 interface according to embodiments of the inventive concepts.

The following description of certain embodiments is merely exemplary in nature and is in no way intended to limit the invention or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the present system. Moreover, for the purpose of clarity, detailed descriptions of certain features will not be discussed when they would be apparent to those with skill in the art so as not to obscure the description of the present system. The following detailed description is therefore not to be taken in a limiting sense, and the scope of the present system and method is defined only by the appended claims.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of a digitizer 1000 described in connection with Texas Instruments' (TI) TI-JESD204-IP, which is a JESD204 rapid design IP for FPGAs connected to TI high-speed data converters, and which is adopted in the M5200A PXIe digitizer mentioned earlier. This digitizer 1000 is described briefly below, but more detailed technical documentation can be found at https://www.ti.com/tool/TI-JESD204-IP.

Referring to FIG. 1, the digitizer 1000 of this example includes an analog-to-digital converter (ADC) unit 100 and a field programmable gate array (FPGA) unit 200. The ADC unit 100 may be utilized to digitize (sample) radio frequency (RF) signals, and the FPGA unit 200 be utilized in the capture and evaluation of the RF signals. Each of the ADC unit 100 and the FPGA unit 200 may be embodied on respective circuit boards or cards, although the inventive concepts are not limited in this manner.

Also in the example of this embodiment, an FPGA Mezzanine Card+ (FMC+) 300 is utilized as the physical connection of the ADC unit 100 to the FPGA unit 200. FMC is a relatively small mezzanine module optimized to provide the physical interface or expansion portal for FPGAs on a carrier card, and FMC+ is an enhancement to FMC. Again, however, the inventive concepts are not limited by the physical connection between the ADC unit 100 and the FPGA unit 200.

The ADC unit 100 of FIG. 1 includes first and second Baluns or amplifiers 101 and 102 which receive a differential analog signal. As those skilled in the art will understand, Baluns are often used to convert a single-ended signal to differential, without adding noise and while maintaining good distortion. A common example of that is in the driver circuit for a high-speed, differential-input analog-to-digital converter (ADC) as represented in FIG. 1. Alternatively, however, differential amplifiers may in adopted in place of the baluns.

Still referring to FIG. 1, the output of the Baluns or amplifiers 101 and 102 are input to an ADC chip 103. The ADC chip 103 of this example includes an analog multiplexer (MUX) 104 at its input which feeds a pair of ADC circuits 105 and 106. The digital output of the ADC circuits 105 and 106 are applied to digital down converter (DDC) circuits or bypass filter circuits 107 and 108 in order to discard data not in the bandwidth of interest.

The ADC unit 100 in the example of FIG. 1 includes onboard power (TI power) 110 and onboard clocking (TI clock, SYSREF and CLOCK) 111, as well as an external clock (EXT CLOCK) terminal.

The FPGA unit 200 includes one or more FPGA chips 201. As will be understood by those skilled in the art, the FPGA chip 201 may include multiple IP cores programmed with IP and processing algorithms. An intellectual property core (IP core) is a functional block of logic or data used to make a field-programmable gate array (FPGA) or application-specific integrated circuit for a product. Commonly used in semiconductors, an IP core is a reusable unit of logic or integrated circuit (IC) layout design.

As one example, programmability of FPGAs allows for design of Graphic Display Controllers (GDCs) for controlling a PC display (400 of FIG. 1) connected to an I/O port of the FPGA unit 200 to display waveforms of data acquired from the ADC unit 100. Flexibility is achieved through integration of optimal GDC's feature sets, which can be set up at the hardware level by IP cores that support certain GDC features. In an example embodiment, the I/O port is a PCIe port.

The FPGA unit 200 further includes one or more data memories 203. The memory 203 can be used for a variety of purposes, including the temporary storage of data samples acquired from the ADC unit 100.

The digital interface between the ADC unit 100 and the FPGA unit 200 is in accordance with JESD204 standards. In other words, the digitizer 100 may be considered a working JESD204 system. This is represented in FIG. 1 by the JESD204B/C interface 109 of the ADC chip 103, and by the JESD204B/C IP core 102 of the FPGA chip 201. Generally, JESD204 technology is a standardized serial interface between data converters (ADCs and DACs) and logic devices (FPGAs or ASICs). Herein, "JESD204" means any of the JESD204 standards, the most recent of which is the JESD204C standard. The interface standard was born out of the need to develop a common method for serializing data converter digital data and reduce the number of interconnects between mixed-signal devices and a processing element such as an FPGA.

64B/66B and 64B/80B coding standards used in JESD204C are complicated and include a SYNC header embedded as the first 2 bits of every frame, which are concatenated into a 32-bit SYNC message. Every run of 66 bits starts with the sync header symbol (2 bits—01 or 10 are valid sync symbols, 00 and 11 are illegal values) encoded into the SYNC header stream. This stream always contains a pilot signal used for sync alignment to the 66-bit frame. Multiple frames form blocks, and groups of blocks form extended multi-blocks. Once the receiver identities where in the stream the SYNC resides, it then moves on to identify where the frames are aligned by using the last frame indicator in the stream to sync to the frame boundaries.

There is no scope of error on the JESD204 link as an error in 1 bit on this interface can cause multiple data samples to be decoded incorrectly, and an error in the SYNC header can cause loss of synchronization between the transmitter and receiver hence resulting in continuous bad decoded data samples.

In the M5200A digitizer, an erroneous state of incorrect data samples being decoded on the JESD204C link occurs when the input source signal is overdriven, outside the permissible range of supported peak to peak voltage of 900 mV. Conventionally, power cycling the module was the only way to restore it back to good state. The embodiments herein are directed in part to overcoming this drawback. That is, in embodiments of the inventive concepts, an in-built mechanism of the digitizer 1000 (e.g., the M5200A digitizer) that is designed to detect error is leveraged to inform the user of an out of bound source signal, and to recover the digitizer from the bad state without the need of power cycling the digitizer module.

Figure 2:
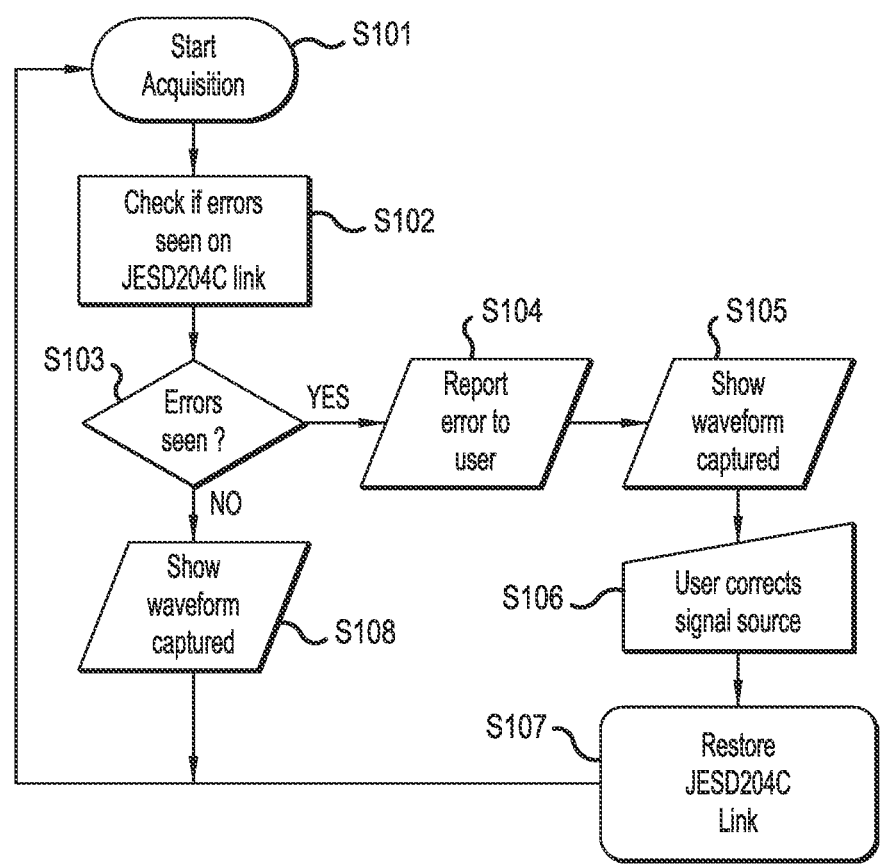
FIG. 2 is a flowchart for reference in describing an error detection and recovery method of the digitizer of FIG. 1 according to embodiments of the inventive concepts.

FIG. 2 is a flowchart for reference in describing a method of recovering a digitizer according to one or more embodiments of the inventive concepts.

Referring to FIGS. 1 and 2, at S101 an analog input source signal is applied to the ADC unit 100, and data samples are acquired on the JESD204C data link from the ADC unit 100 to the FPGA unit 200.

At S102, the IP controller (e.g., the JESD IP) of the FPGA unit 200 checks the data samples for errors.

In the case where no errors are seen (NO at S103), the FPGA unit 200 communicates with the PC 400 to display to a waveform of the captured data samples. In other words, the JESD204 system operates in a normal manner.

On the other hand, when the data samples include errors (YES at S103), the IP controller communicates with the PC 400 to display an error message at S104 and to display device a waveform of the captured data samples at S105. In response, at S106, the user adjusts a voltage of the input signal source to within a given peak-to-peak voltage range. The IP controller then resets the data link at S107 without power cycling of the digitizer module.

For example, when the data samples captured are incorrect, the JESD IP reports header or CRC error seen in received JESD204C frames from the ADC 100 indicating that the source signal is overdriven. The FPGA unit 200 design keeps track of these errors on runtime.

Irrespective of erroneous capture or correct waveform captured, the waveform is shown to the user. In the case of incorrect samples captured, an ERROR message is also reported such as "ADC CRC ERROR: This could be due to connectivity issues or channels being driven out of valid input voltage specification".

The user, after making changes to the source signal, restarts the acquisition process. During this process, "flush" action intelligently checks if the error has occurred and resets the JESD204C link to restore it back. This process of self-recovery is transparent to the user. Here, flush generally refers to the process of detecting and removing corrupt or inaccurate records from the FPGA 201 and Memory 203. In some embodiments of the inventive concepts, after the user adjusts the voltage of the input signal source, new data samples are acquired and a flush operation is executed to confirm an absence of errors before the IP controller resets the data link.

In the example of the M5200A digitizer, high sampling rate of 4.8 GSa/see and perfect capturing of 12-bit data samples is possible using for a source signal with a permissible voltage within 900m Vpp. In case the source signal is out of permissible range causing incorrect data capturing, the in-built error detection and recovery mechanism of the digitizer, restores the digitizer to a good state and resumes perfect waveform capturing without the requirement of power cycling.

FIG. 3 is a screen shot showing an example in Python of what the user might see in the case where the source signal voltage (e.g. 1 volt) is outside the permissible range. It can be seen that errors are indicated on each channel between the ADC and FPGA, and that the previously given example of an error message is displayed.

Figure 4:
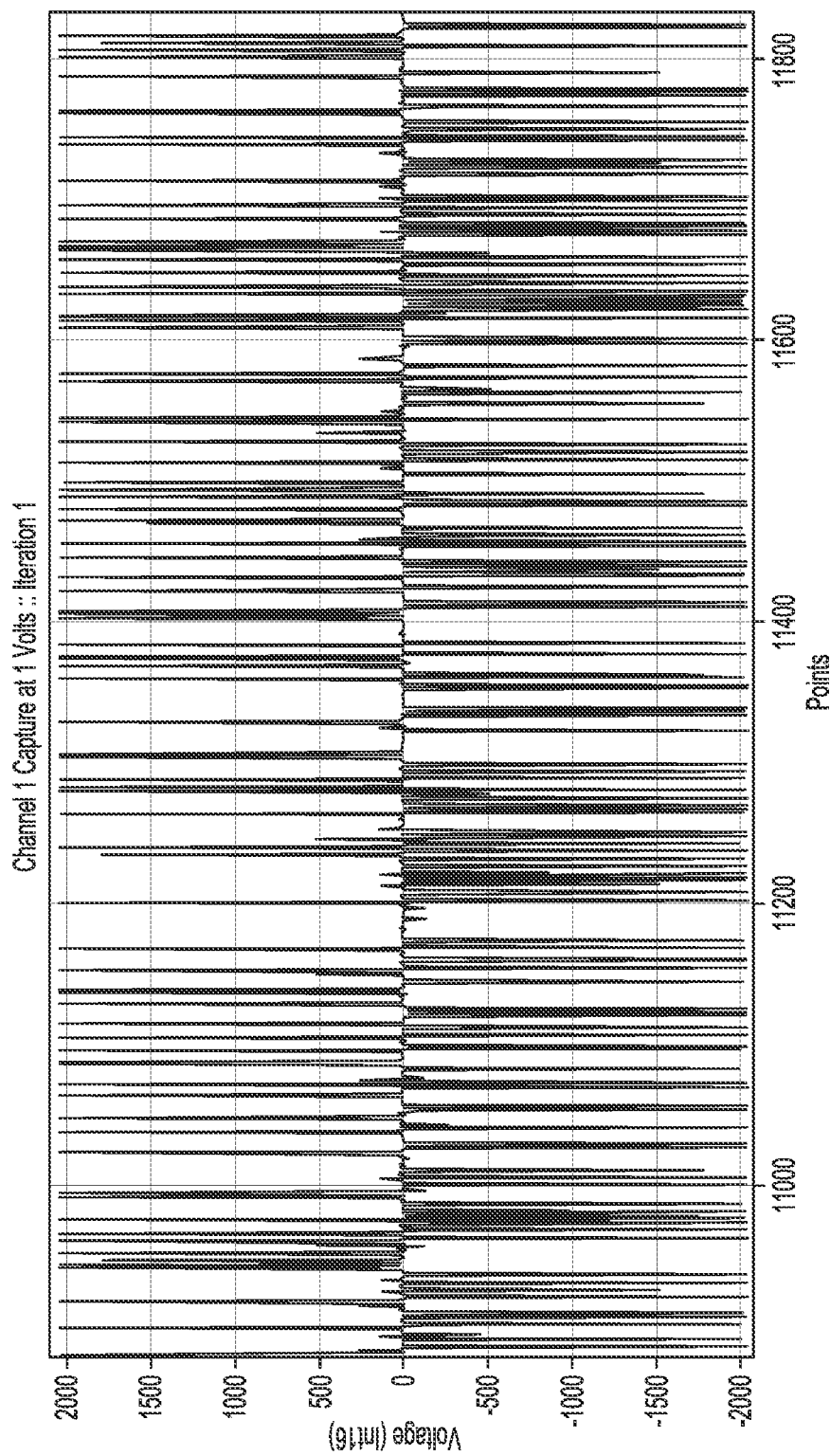
FIGS. 4-8 are examples of waveforms display during execution of the method of FIG. 2.
Figure 5:
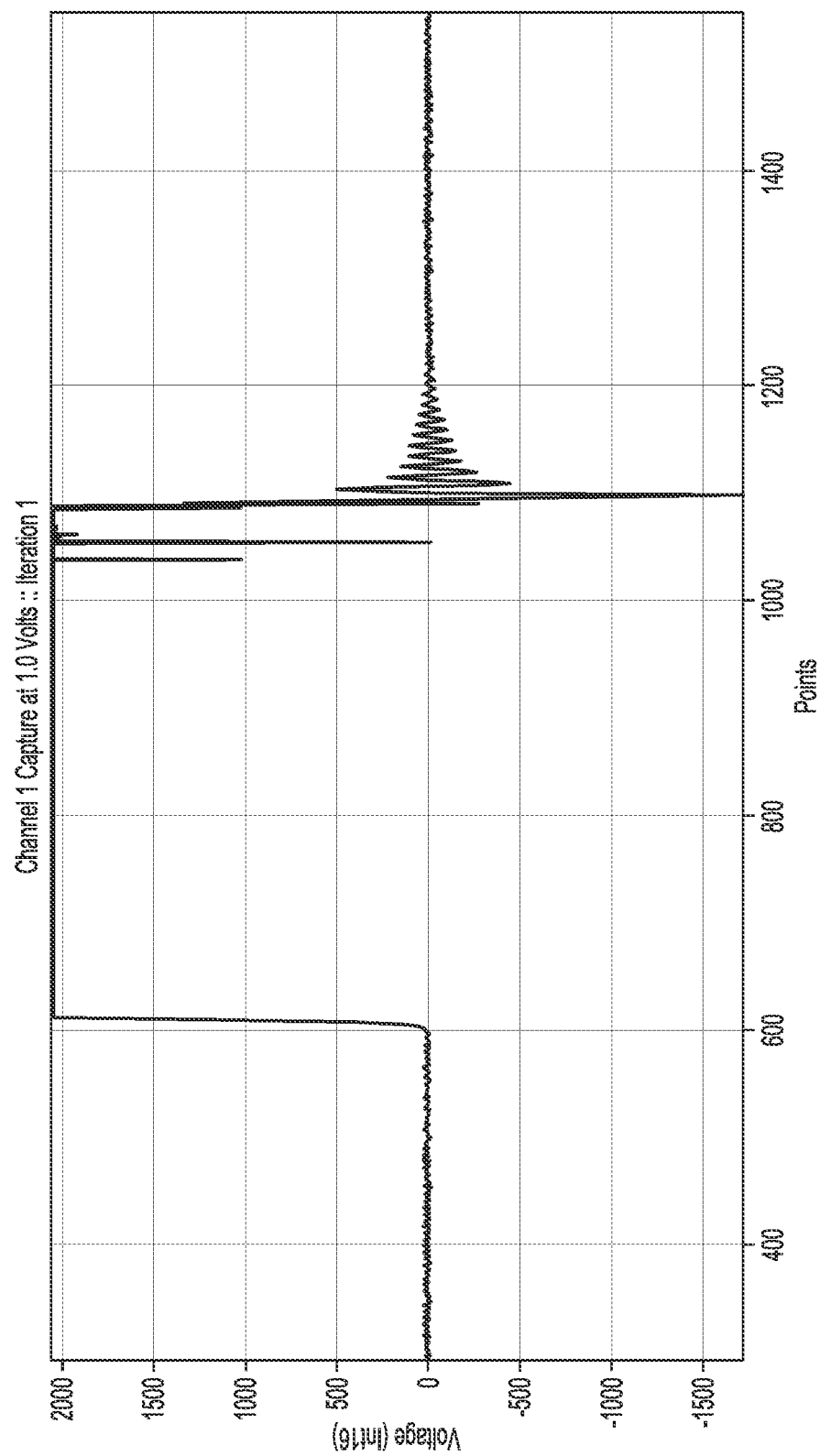
Figure 6:
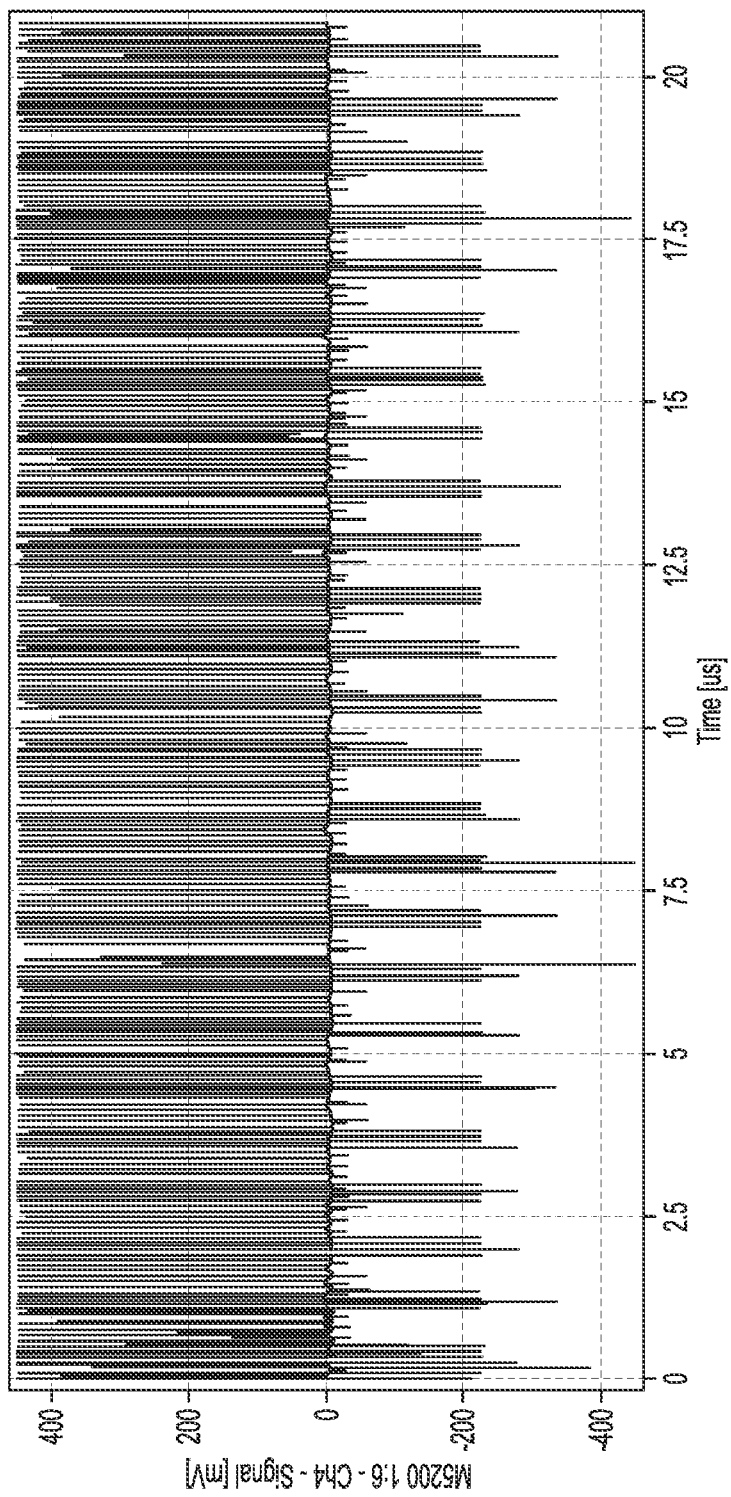

The implementation discussed above has been successfully tested and demonstrated using the M5200A digitizer, and FIGS. 4-8 examples of resultant displayed waveforms. FIG. 4 the incorrect waveforms captured on an entire 1 channel, FIG. 5 shows a zoomed capture of incorrect data on the 1 channel, and FIG. 6 shows waveforms of incorrect data on all 4 channels operating in parallel. In each case, the source signal voltage 1V, which is outside the permissible range of 900 mV.

Figure 7:
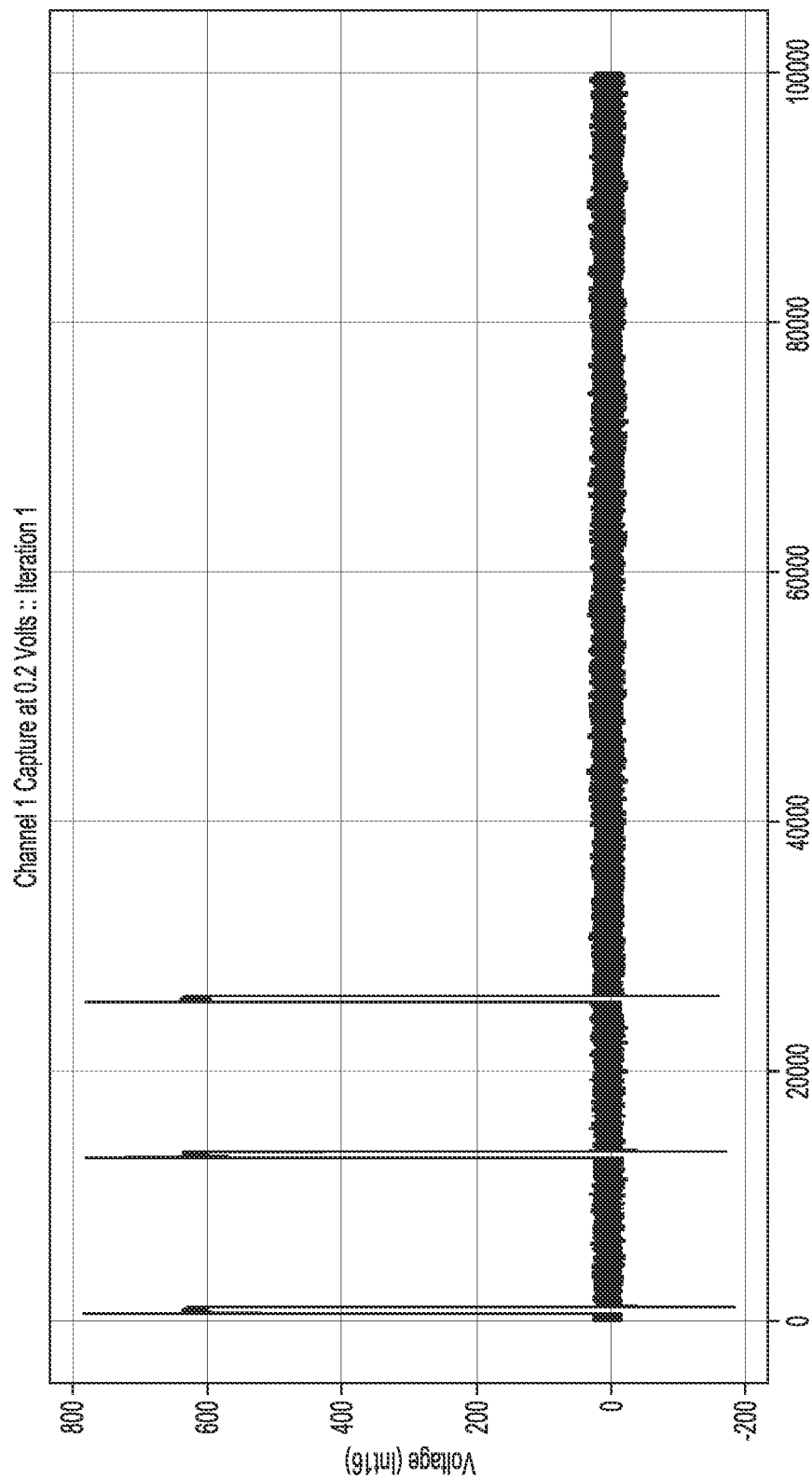
Figure 8:
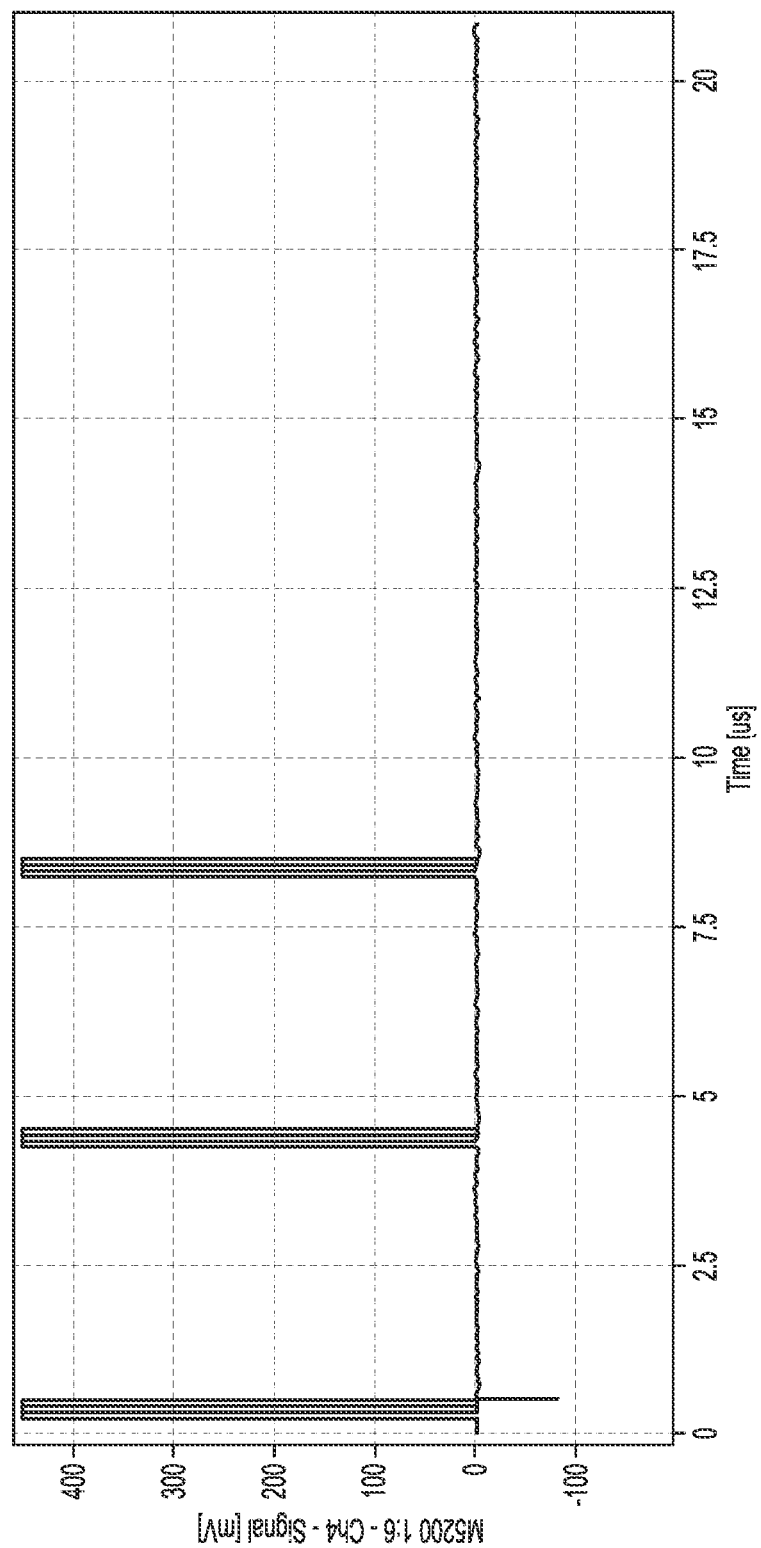

After display of the waveforms and error messages (such as in FIG. 3), the input signal voltage is adjusted to 0.2V by user, and the JESD204 link reset, FIG. 7 shows the new data capture for the 1 channel, and FIG. 8 shows the new data capture for all 4 channels operating in parallel. No errors are observed.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An error detection and recovery method for a digitizer, the digitizer including an analog-to-digital converter (ADC), a field programmable gate array (FPGA), a data link of a given interface standard between the ADC and the FPGA, and a display device operatively connected to the FPGA, the FPGA including an IP controller configured according to the interface standard of the data link, the method comprising:
   applying an analog input source signal to the ADC;
   acquiring data samples on the data link from the ADC to the FPGA;
   the IP controller checking the data samples for errors;
   when the data samples include errors, (a) the IP controller displaying on the display device a waveform of the captured data samples and an error message, (b) a user adjusting a voltage of the input signal source to within a given peak-to-peak voltage range, and (c) the IP controller resetting the data link without power cycling of the digitizer;
   when the data samples do not include errors, displaying on the display device a waveform of the captured data samples.

2. The method of claim 1, wherein the data link is a JESD204 link, and the IP controller is a JESD IP controller.

3. The method of claim 1, wherein resetting of the data link is transparent to the user.

4. The method of claim 1, wherein, when the data samples include errors, after the user adjusts the voltage of the input signal source, new data samples are acquired and a flush operation is executed to confirm an absence of errors before the IP controller resets the data link.

5. The method of claim 1, wherein the data samples are acquired at a sampling rate of at least 4.8 GSa/sec.

6. The method of claim 5, wherein data samples are at least 12-bit data samples.

7. The method of claim 1, wherein the peak-to-peak voltage range is about 900 mV.

8. A digitizer comprising:
   an analog-to-digital converter (ADC) configured to obtain data samples of an input analog source signal;
   a field programmable gate array (FPGA) including an IP controller and an I/O port for connection to a display device;

a data link between the ADC and the FPGA, the data link operating according to a given interface standard, wherein the IP controller of the FPGA is configured to communicate with the interface standard of the data link; and wherein the FPGA is configured to:
  acquire data samples on the data link from the ADC;
  check the data samples for errors;
  when the data samples include errors, (a) displaying on the display device a waveform of the captured data samples and an error message, and (b) after a voltage of the input analog source signal is adjusted to within a given peak-to-peak voltage range, restoring the data link without power cycling of the digitizer;
  when the data samples do not include errors, displaying on the display device a waveform of the captured data samples.

9. The digitizer of claim 8, wherein the data link is a JESD204 link, and the IP controller is a JESD IP controller.

10. The digitizer of claim 8, wherein resetting of the data link is transparent to the user.

11. The digitizer of claim 8, wherein the voltage of the input analog source signal is adjusted by a user.

12. The digitizer of claim 11, wherein, when the data samples include errors, after the user adjusts the voltage of the input signal source, the IP controller is configured to acquire new data samples and execute a flush operation on previously acquired data samples to confirm an absence of errors before the IP controller resets the data link.

13. The digitizer of claim 8, wherein the data samples are acquired at a sampling rate of at least 4.8 GSa/sec.

14. The digitizer of claim 13, wherein data samples are at least 12-bit data samples.

15. The digitizer of claim 8, wherein the peak-to-peak voltage range is about 900 mV.

* * * * *